July 21, 1942.  R. A. CHADWICK, JR  2,290,738
MOTORIZED HAULING AND DUMPING VEHICLE
Filed April 1, 1940  3 Sheets-Sheet 1
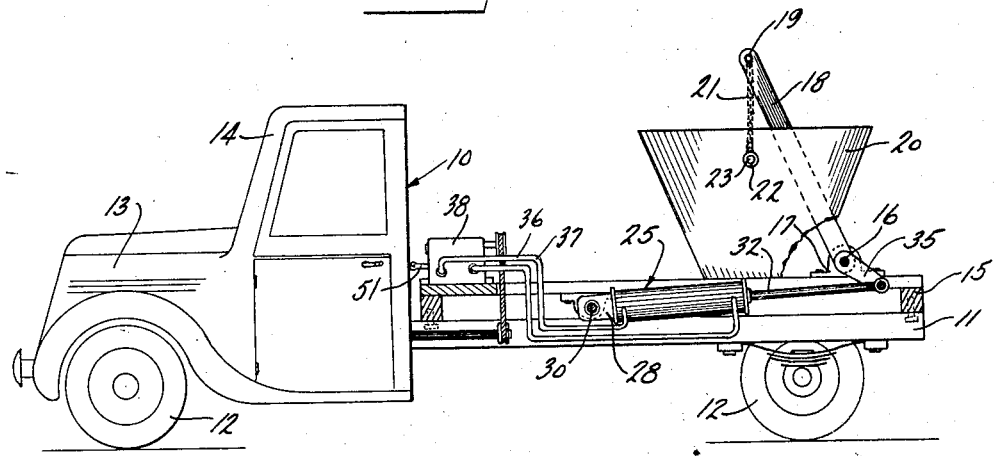
Fig: 1
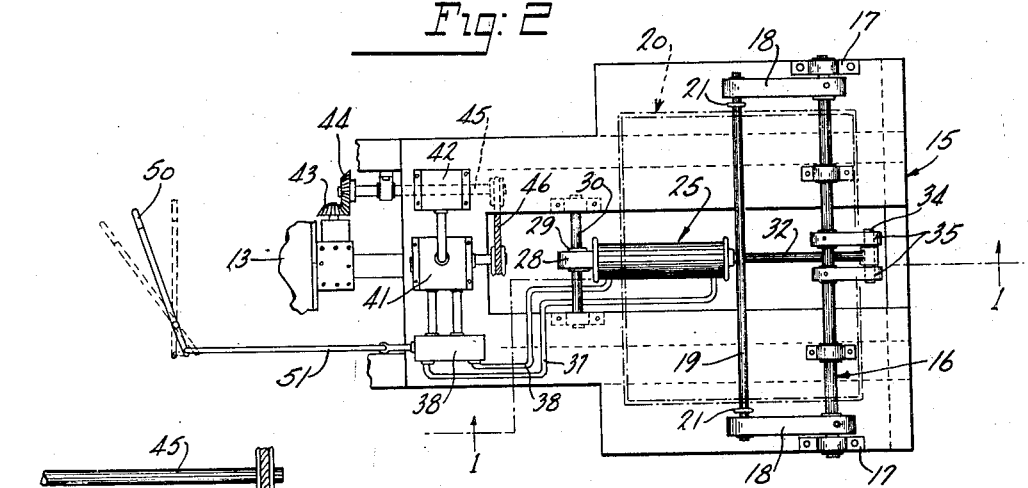
Fig: 2
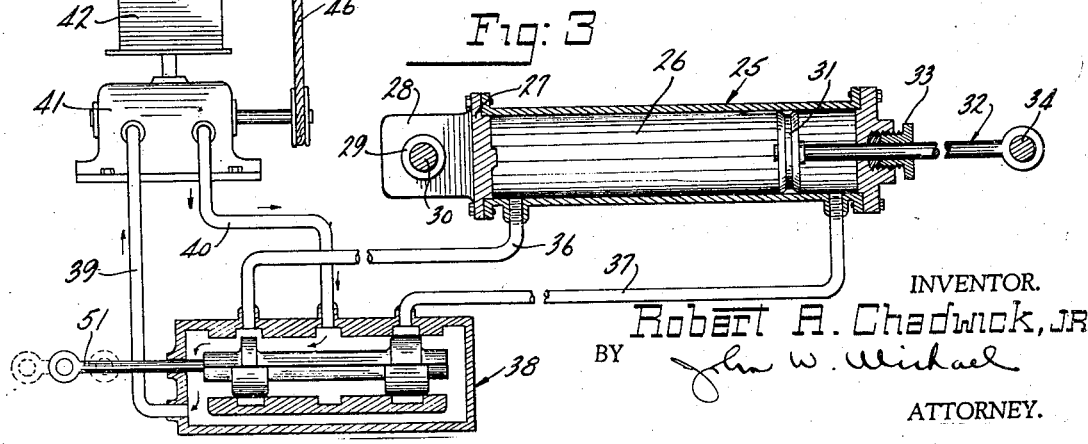
Fig: 3
INVENTOR.
Robert A. Chadwick, Jr.
BY John W. Michael
ATTORNEY.

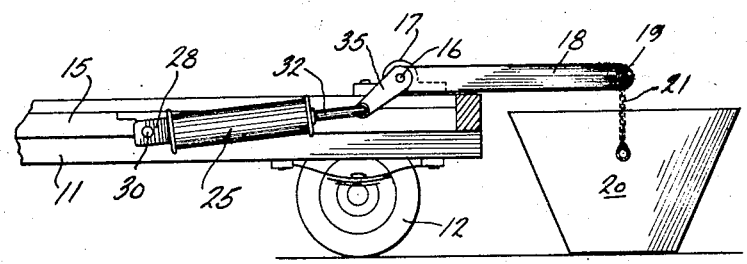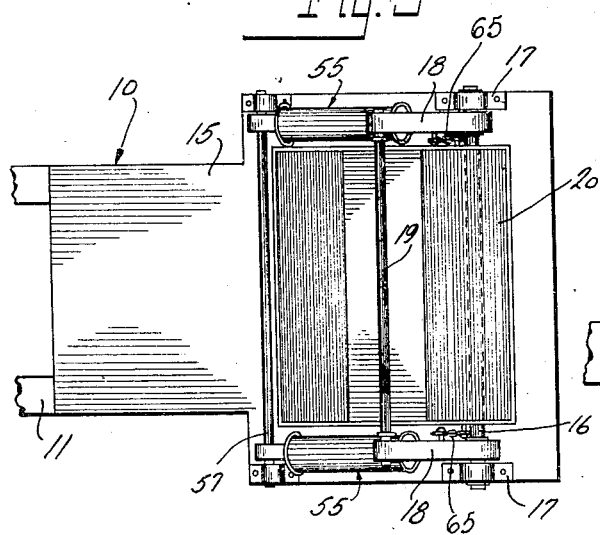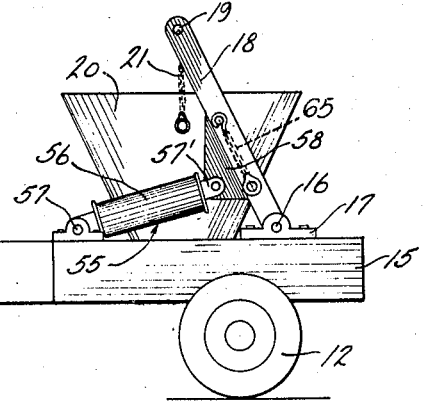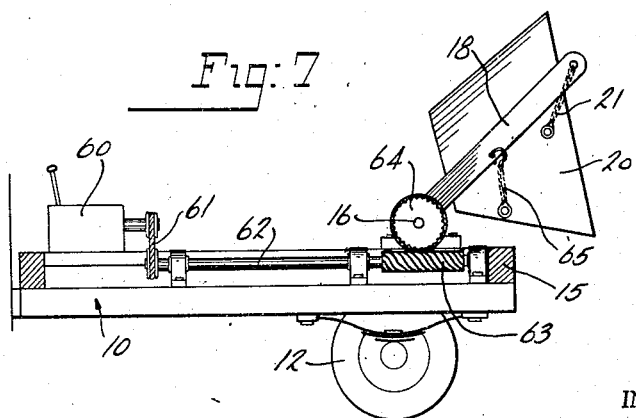

UNITED STATES PATENT OFFICE 2,290,738

MOTORIZED HAULING AND DUMPING VEHICLE

Robert A. Chadwick, Jr., Milwaukee, Wis.

Application April 1, 1940, Serial No. 327,126

3 Claims. (Cl. 214—77)

This invention relates to an improvement in motor vehicles of the truck type designed for transporting and handling material, such as dirt, stone, gravel, or any other similar material.

The invention is of the type wherein a motor-driven truck is designed to handle a plurality of skips or truck bodies so that certain of the skips or bodies may be loaded while the truck is transporting others from one place to another.

One of the principal objects of the invention is to provide a motor-driven vehicle of this character, which is simple though strong and rugged in construction, reliable, effective and rapid in operation, and easy and comparatively inexpensive to manufacture, install, and maintain.

Another object of the invention is to provide a motor vehicle of this character and having these advantages, and which exercises a smooth and complete control over the skip at all times, namely when the loaded skip is being hoisted into position on the truck for transportation and when it is being moved off of the truck and dumped or discharged at the point of deposit of the material.

A further object of the invention is to provide a motor-driven vehicle of this character in which the means for hoisting and dumping the skips or removable truck bodies is power-operated, preferably hydraulically operated, and wherein the control over the power means is simple and convenient.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 1 is a view partly in side elevation and partly in vertical cross section, taken on line 1—1 of Figure 2 and illustrating a motor-driven truck constructed in accordance with the present invention, a portion of the skip being broken away to better illustrate the manner in which the fluid pressure motor is combined with the means employed for hoisting and lowering the skip.

Figure 2 is a fragmentary view in top plan further illustrating the construction shown in Figure 1, the skip being omitted for the sake of illustration.

Figure 3 is a diagrammatic view, partly in elevation and partly in section, illustrating a fluid pressure motor for actuating means which hoists and lowers the skip, and showing diagrammatically one way in which its motor may be powered and controlled.

Figure 4 is a fragmentary view in side elevation showing the skip in the position which it occupies when it is about to be hoisted on to the truck.

Figure 5 is a fragmentary view in top plan showing a modified form of the invention.

Figure 6 is a fragmentary view in side elevation further illustrating the modification shown in Figure 5.

Figure 7 is a diagrammatic view, partly in side elevation and partly in longitudinal, vertical cross section, illustrating still another form of the invention.

Figure 8:
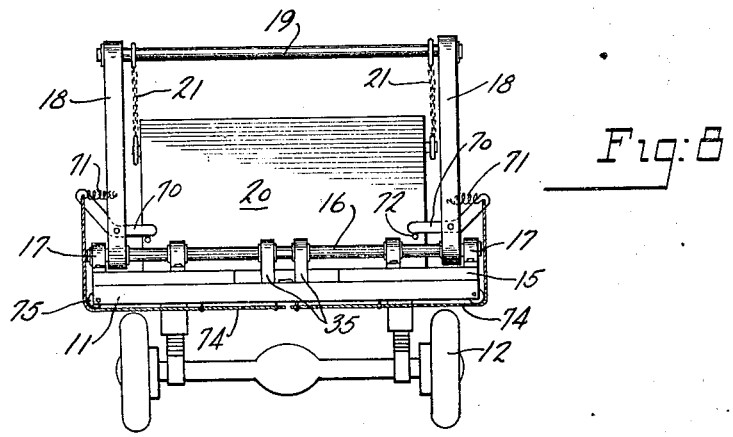
Figure 8 is a view in rear elevation illustrating a mechanism which may be employed to control the dumping of the skip.

Referring to the drawings, the numeral 10 designates generally a motor-driven truck with which the mechanism constituting the present invention is combined. The truck may be of any standard or conventional structure, and has the usual chassis 11 supported on wheels 12. It is powered by the usual engine 13, and ordinarily will be equipped with a cab 14. Supported on and securely bolted down or otherwise fastened to the chassis of the truck is a suitable frame or platform 15.

Means is provided on the truck for hoisting loaded skips on to the body thereof and for lowering and depositing or dumping the skip at the place of deposit.

In all forms of the invention, this means includes a main shaft 16 supported for rotation in bearings 17 supported upon and fastened to the platform 15. In the constructions illustrated, the shaft 16 extends transversely of the platform 15 adjacent the rear end of the truck. Booms 18 are fixed to the shaft 16, there being one boom adjacent each end of the shaft. The booms are in the form of lever arms of suitable length and it is at their inner ends that they are secured to the main shaft 16. At their outer ends the booms 18 are connected by a cross shaft or cross member 19, the ends of which are fixed in suitable openings provided therefor in the booms. In the drawings only one skip, designated at 20, is illustrated, but it is to be understood that the present invention proposes to provide a plurality of skips, the number depending upon the conditions, and that the skips are to be successively employed. In order that the skips may be hoisted, handled, and dumped by the booms, supporting chains 21 are attached to the cross shaft 19, and at their lower ends have eyes or hooks 22 designed to be releasably secured to outwardly projecting trunnions 23 provided on the side walls of each skip.

The shaft 16, its pair of booms 18, cross member 19, and chains 21, provide in each form of the invention a cradle-type derrick for the skips or bodies 20. While preferably the cradle-type derrick thus provided works over the rear end of the truck, obviously the elements could be rearranged to work over the side of the truck.

In all embodiments of the invention power means is provided to swing the booms 18 back and forth so as to hoist the skips 20 on to the platform 15 and lower them therefrom on to the ground or to dump them. Such power means may take various forms.

In the form of the invention shown in Figures 1 to 4, inclusive, a fluid pressure motor, designated generally at 25, is provided. The motor 25 comprises a cylinder 26 having a head 27 at one end thereof formed with an integral lug-like extension 28. A bearing 29 is provided in the lug-like extension 28 and receives a short supporting shaft 30 carried by the frame and serving the purpose of supporting the cylinder 26 of the fluid pressure motor 25 on the frame 15 for swinging or oscillating movement about a fixed axis. A piston 31 is fitted in the cylinder 26 for reciprocatory movement, and has a piston rod 32 secured thereto and projecting through a stuffing box 33 provided in the head of the cylinder opposite its swingable support. The piston rod 32 is pivotally interconnected at its outer end with a wrist-pin 34, which in turn is pivotally mounted or otherwise suitably combined with crank arms 35 fixed to and rotatable with the main shaft 16.

The motor 25 is a double-acting fluid pressure motor. Supply and exhaust of fluid under pressure to the opposite ends of the cylinder 26 is had by virtue of provision of pressure lines 36 and 37 leading to the opposite ends of the cylinder from a distributing or control valve, designated generally at 38. Pressure lines 39 and 40 lead to the control valve from a pump 41. The pump 41 draws its motor fluid from a suitable reservoir 42, and it is actuated from the engine of the truck by virtue of the provision of the power take-off 43, which acts through suitable motion transmission mechanism, such as beveled gear 44, shaft 45, and belt and pulleys 46, to rotate the driving shaft of the pump 41. The valve 38 may be conveniently controlled from the cab of the truck by virtue of the provision of a control lever 50 in the suitable system of links and levers represented diagrammatically at 51 operatively interposed between the control lever and the valve 38. The distributing or control valve 38 is of conventional construction and is only diagramatically illustrated as its action is well understood by those skilled in the art. The valve is shown in neutral position wherein it locks the fluid in the cylinder 26. If shifted to the right from the position shown in Figure 3, it supplies fluid under pressure to cylinder 26 through pressure line 37, and exhausts it through line 36. If shifted to the left from the position shown in Figure 3 the valve 38 directs the fluid under pressure to cylinder 26 through pressure line 36 and exhausts it through pressure line 37.

With this construction, when a loaded skip is to be hoisted on to the truck, the valve 38 is manipulated to cause the fluid pressure motor 25 to swing the booms 18 to the position shown in Figure 4, the truck at this time being backed up to the skip 20 to be picked up. The chains 21 are then attached to the trunnions of the skip 20. Following this the control valve 38 is manipulated to cause the fluid pressure motor 25 to swing the booms 18 up to the position shown in Figure 1, thereby hoisting the skip 20 on to the frame or platform 15. The platform 15 supports the skip 20 at a point well in advance of the rear axle of the truck. A reverse actuation of the motor 25 at the point of deposit will be effective to deposit or dump the skip.

In the construction illustrated in Figures 5 and 6 a motor truck 10 is provided as before; likewise, frame 15, skip 20, booms 18 carried by the main shaft 16, the skip 20 being suspended from the booms by the chains 21. In this form of the invention, however, in lieu of having the single pressure motor operatively interconnected with the booms by means of a crank combined with the main shaft 16, two fluid pressure motors, designated at 55, are provided, one being provided at each side of the machine, and these motors are of identical construction and each has a cylinder 56 swingably connected as at 57 to the frame 15. The usual piston is combined with the cylinder 55 of each fluid pressure motor and has a piston rod 57 which is pivotally interconnected with a gusset plate 58 fixed to the adjacent boom 18. In this form of the invention the motors are directly and operatively interconnected with the booms 18 without the interpositioning of any motion transmission mechanism.

In the form of the invention shown in Figure 7 a motor truck 10 is provided as before, likewise booms 18 and skip 20, and the skip is suspended from the boom by means of chains 21. In this form of the invention, however, a different type of means is employed for swinging the boom, and comprises a transmission 60, powered by the engine of the truck and acting through belt and pulley 61 to drive a worm shaft 62. The worm shaft 62 is equipped with a worm 63 which meshes with the worm wheel 64 fixed to the main shaft 16. The worm and worm wheel are reversible in their action so that the motor is effective to hoist and dump the skip. In this form of the invention the skip is automatically dumped by attaching tie chains 65 to the lower portion of the skip 20 and releasably securing such chain 65 to intermediate portions of the booms. Similar tie chains may be provided with the other embodiments of the invention shown in Figures 1 to 6, inclusive, if desired.

Figure 9:
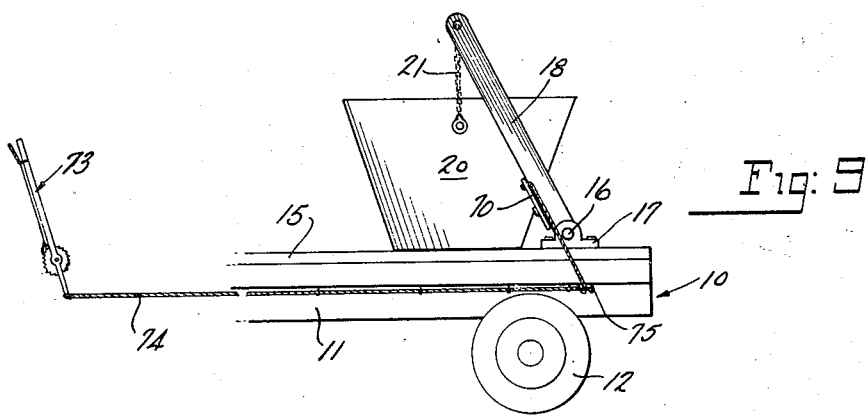
Figure 9 is a diagrammatic view in side elevation of the structure shown in Figure 8.

In the form of the invention shown in Figures 8 and 9 the truck 10 is provided as before and is equipped with the platform 15 on which shaft 16 is supported in bearings 17. The shaft 16 carries the booms 18 from which the skip 20 is suspended by the chains 21. In this form of the invention a means somewhat different from the tie chains 65 is provided to control the dumping of the skip. The means shown in Figures 8 and 9 consists of a latch 70 pivoted to each boom 18 and disposed, in its latching position, in overlapping engagement with one wall of the skip, as shown in Figures 8 and 9. The latches are biased by springs 71 to latching position, and in latching position engage stop pins 72 carried by the skip. The latches may be released from a point of convenient control by virtue of the provision of a hand lever 73 fulcrumed adjacent the control station and connected by a system of cables or flexible element 74 and pulleys 75 to the latches. The operator by pulling on the hand lever 73 may swing the latches to a position where they disengage the skip 20, thereby allowing the skip to swing freely. Reverse movement of the hand lever permits the latches to return to latching position under the influence of their biasing springs. When the latches 70 are in latching positions, and booms 18 swing to lower the skip toward the ground, the skip is automatically dumped.

While the apparatus above described may be very advantageously used for handling skips in the manner pointed out, the present invention also contemplates the use of this apparatus for handling loads other than skips, and in some instances a crane-like derrick may be employed to lift loads off of the ground and deposit them on the platform of the vehicle, or even in a fixed vehicle body. One of the advantageous features of the invention resides in the fact that the crane-like derrick may be utilized to pick up a load from the ground and deposit it on the vehicle platform ahead of the transverse shaft which actuates the booms.

While I have shown and described several constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claims.

I claim:

1. An automatic load hauling and dumping vehicle of the character described comprising a loading and unloading boom assembly mounted adjacent the rear end of the chassis of the vehicle and including a rigid rectangular frame, one side of said frame also constituting the operating shaft of the boom assembly and being disposed transversely of the chassis of the vehicle and pivotally supported thereon, the opposite side of the frame from said shaft constituting a cross member for supporting loads and for stiffening the assembly, the other two sides of the frame constituting the lifting arms on the boom assembly, a reversible power operating mechanism for said boom assembly controlled at will and being operable to swing said boom assembly through an arc sufficient to move the outer cross member thereof to a position overlying the ground beyond the end of the vehicle chassis and also to a position overlying the vehicle chassis at a point ahead of the operating shaft of the boom assembly, in combination with a load container or skip, means suspending the skip in a swinging position from the cross member of the boom assembly and between the lifting members thereof, and means utilizing the swinging movement of said lifting arms to effect automatic dumping of the skip when the boom assembly is swung in one direction.

2. An automatic load hauling and dumping vehicle of the character described comprising a loading and unloading boom assembly mounted adjacent the rear end of the chassis of the vehicle and including a rigid rectangular frame, one side of said frame also constituting the operating shaft of the boom assembly and being disposed transversely of the chassis of the vehicle and pivotally supported thereon, the opposite side of the frame from said shaft constituting a cross member for supporting loads and for stiffening the assembly, the other two sides of the frame constituting the lifting arms on the boom assembly, a reversible power operating mechanism for said boom assembly controlled at will and being operable to swing said boom assembly through an arm sufficient to move the outer cross boom thereof to a position overlying the ground beyond the end of the vehicle chassis and also to a position overlying the vehicle chassis at a point ahead of the operating shaft of the boom assembly, in combination with a load container or skip, means suspending the skip in a swinging position from the cross member of the boom assembly and between the lifting members thereof, and tie chains releasably interconnecting the skip and booms for effecting automatic dumping of the skip.

3. An automatic load hauling and dumping vehicle of the character described comprising a loading and unloading boom assembly mounted adjacent the rear end of the chassis of the vehicle and including a rigid rectangular frame, one side of said frame also constituting the operating shaft of the boom assembly and being disposed transversely of the chassis of the vehicle and pivotally supported thereon, the opposite side of the frame from said shaft constituting a cross member for supporting loads and for stiffening the assembly, the other two sides of the frame constituting the lifting arms on the boom assembly, a reversible power operating mechanism for said boom assembly controlled at will and being operable to swing said boom assembly through an arm sufficient to move the outer cross boom thereof to a position overlying the ground beyond the end of the vehicle chassis and also to a position overlying the vehicle chassis at a point ahead of the operating shaft of the boom assembly, in combination with a load container or skip, means suspending the skip in a swinging position from the cross member of the boom assembly and between the lifting members thereof, and a manually operable latch mechanism cooperable with the skip to effect automatic dumping thereof.

ROBERT A. CHADWICK, Jr.